H. KLEMM.
FLOWER POT.
APPLICATION FILED MAR. 9, 1909.
954,440.
Patented Apr. 12, 1910.
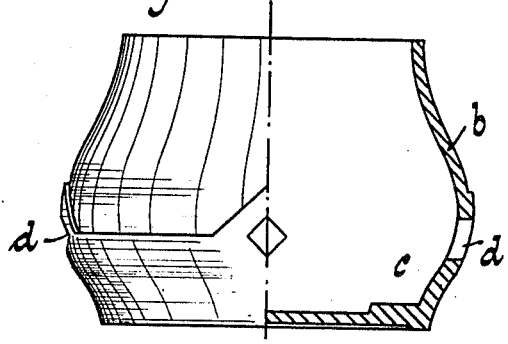
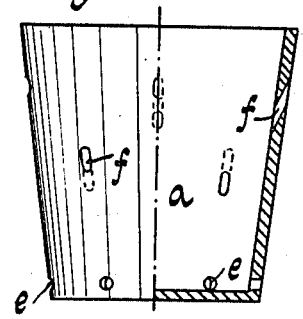
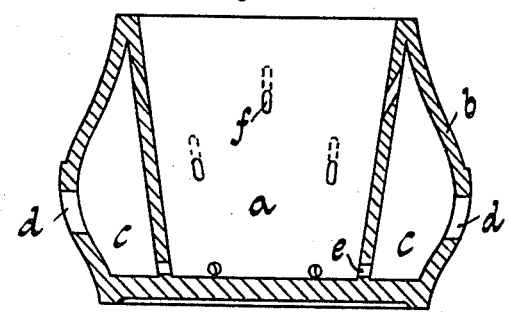
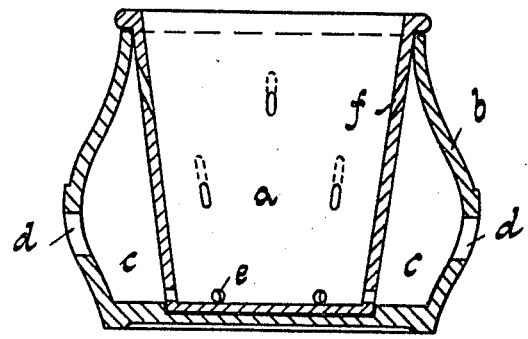
Witnesses.
Inventor

UNITED STATES PATENT OFFICE.

HANS KLEMM, OF DRESDEN, GERMANY.

FLOWER-POT.

954,440. Specification of Letters Patent. Patented Apr. 12, 1910.

Application filed March 9, 1909. Serial No. 482,297.

*To all whom it may concern:*

Be it known that I, HANS KLEMM, a subject of the German Emperor, and resident of 17 Schlossstrasse, Dresden-A, Germany, have invented certain new and useful Improvements in and Relating to Flower-Pots, of which the following is a specification.

The present invention relates to a flower pot consisting of an inner part carrying the flower and being provided with passages for water and air and of an outer part, hereafter called the mantle, provided with air passages, which surrounds said inner part, so that between the perforated double walls a hollow chamber is produced which occupies the place of the heretofore known flower top support and from which t'$_e$; roots and the mold of the flowers can suck water and breathe air.

The invention serves for the purpose to do away with those well known plates usually placed under the flower pot. Besides by the arrangement of the double and perforated walls of the pot the flowing off of the superfluous water is attained as well as the sucking up of the same by the roots regulated in a manner most advantageous for the life and growing of the flower. Furthermore the airing of the roots and of the mold of the flowers is most perfectly reached. The ugly shape of the well known flower pots is also dispensed with and replaced by a tasteful outer appearance.

In the accompanying drawing in which I have shown my invention by illustrations like letters of reference refer to like parts throughout the different views.

In said drawings, Figure 1 shows a side view of my improved flower pot partly in section the inner pot being removed, Fig. 2 shows a side view of the inner pot partly in section, Fig. 3 shows a cross section of one construction of my improved flower pot, and Fig. 4 shows a cross section of a second construction of my improved flower pot.

The flower pot consists of an inner pot $a$ receiving the flowers and the mold for the same and of an outer mantle $b$ surrounding said pot and both parts can be made of various shapes.

The outer mantle $b$ is of such shape that between it and the inner pot $a$ an intermediate chamber $c$ is formed which provides several air passages $d$. The inner pot has near its bottom several water passages and farther upward several air passages through which the flowers can breathe. The air passages are oblique and downward directed from the outside to the inside of the pot, so that the earth can not drop outside.

The pot consists either as shown in Fig. 3 of one piece and in this case the inner pot and the outer mantle form a firm whole or as shown in Fig. 4 both parts are separated and the inner part can easily be removed from the outer mantle. In both cases the superfluous water can easily enter the hollow chamber $c$ from where the roots and the mold of the flowers can again suck up the water. Furthermore the flowers breathe fresh and wetted air from said chamber $c$. Besides this selfacting regulation of the fed water and air makes it impossible that the mold of the flower becomes sour.

The pot can be made of any size and shape and consists preferably of porous or of any other suitable material. In consequence of the arrangement of air passages the pot can be glazed.

What I claim as new and desire to secure by a United States Letters Patent, is:—

1. In a flower pot the combination of an inner pot having oblique air openings at its upper part for continually admitting air to the earth inside the pot and straight drain openings at the bottom of the pot for guiding the superfluous water into a reservoir and an outer pot having passages admitting air from the outside forming with the wall of the inner pot said reservoir adapted to automatically feed again the drained water to the earth of the inner pot, if necessary, substantially as described and for the purpose set forth.

2. In a flower pot the combination of an inner and an outer pot having air passages at their upper parts to continually admit the entrance of air to the earth in the inner pot and water drain passages at the lower part of the inner pot adapted to let the water drained into the outer pot continually communicate with the earth of the inner pot substantially as described and for the purpose set forth.

In testimony whereof I have hereunto signed my name this 15th day of February, 1909, in the presence of two subscribing witnesses.

HANS KLEMM.

Witnesses:
HARRY A. MCBRICK,
OTTO BRANDMEISTER.